March 24, 1970  A. W. SPENCER  3,502,765
METHOD OF CONTROLLING EDGE FLATNESS OF MECHANICALLY
EMBOSSED ORIENTED POLYMER SHEETING
Filed Aug. 24, 1967
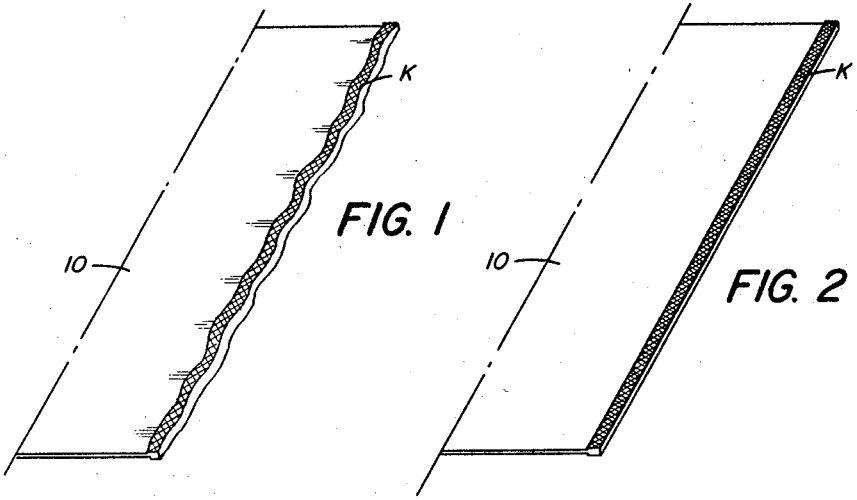
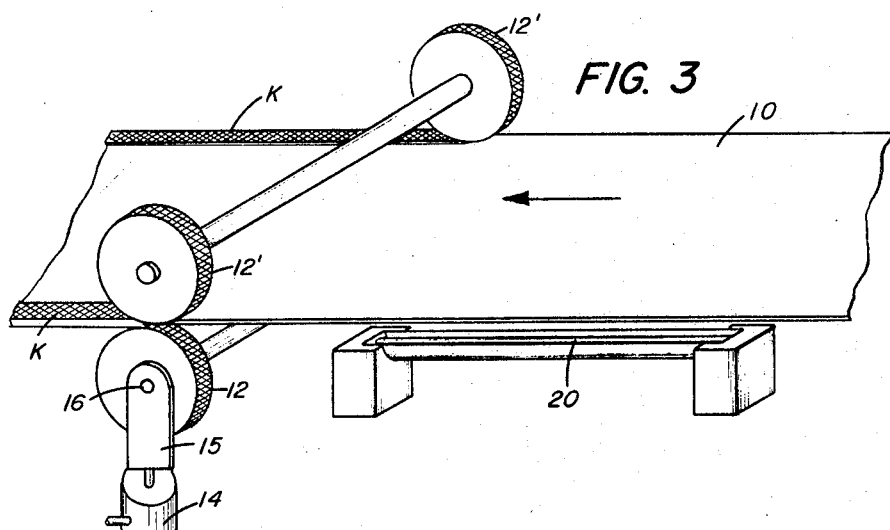
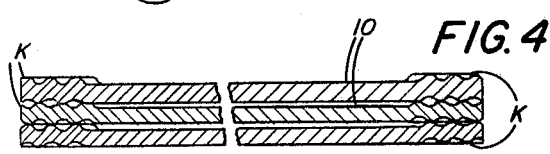
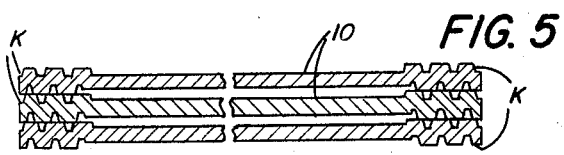
ARTHUR W. SPENCER
INVENTOR.
BY
ATTORNEYS United States Patent Office 3,502,765
Patented Mar. 24, 1970

3,502,765
METHOD OF CONTROLLING EDGE FLATNESS OF MECHANICALLY EMBOSSED ORIENTED POLYMER SHEETING
Arthur W. Spencer, Rochester, N.Y., assignor to Eastman Kodak Company, Rochester, N.Y., a corporation of New Jersey
Filed Aug. 24, 1967, Ser. No. 663,063
Int. Cl. B29c 17/00
U.S. Cl. 264—230                                        3 Claims

ABSTRACT OF THE DISCLOSURE

In order to overcome objectionable deformations which appear in the edges of an oriented polymeric thermoplastic sheet material when its edges are mechanically embossed to increase the thickness thereof, the edge portions of the sheet are locally preheated just prior to the embossing operation.

---

This invention relates to the manufacture of polymeric thermoplastic sheeting, and more particularly it pertains to an improved treatment of the edges of the sheeting material which produces a high quality product with improved handling characteristics.

In the manufacture of thermoplastic sheeting material it is common practice to employ an added thickness or physical re-formation at the edges of the sheeting during some stage of its fabrication to improve the winding characteristics of the roll when the material is wound up, and further, to improve the ability to manipulate the sheeting during subsequent processing steps. One of the forms of physical re-formation apparatus commonly used is a knurling device. In this instance, a closely spaced pattern of projections on small wheels is forced into the edge portions of the thermoplastic sheeting under pressure to produce a projection on the opposite side of the sheet, thereby providing a thickened, "load carrying" edge on the sheeting. In most cases, two knurling wheels are used in opposition so that the projections extend from both surfaces of the sheet at the edges.

I have found that the forces required to create the knurl projections in the edges of the sheet cause a general deformation on the edges of the sheet. In some cases this deformation takes the form of a lengthwise "fluting" of that portion of the sheet adjacent to the edge as shown in FIG. 1. In other cases, the forces and plastic flow caused by the knurling operation result in a locally deformed area, a wavy pattern as also indicated in FIG. 1. During subsequent processing operations through which the sheet might be subjected, including being wound up in a roll, the capability of the knurled edge to improve the handling characteristics of the sheeting are seriously diminished by the fluting and/or cupping in the knurl area.

The primary object of the present invention is to prevent the formation of locally deformed areas at the edges of a thermoplastic sheeting as the result of the knurling operation.

Another object is to prevent the formation of these locally deformed areas at the edges of a thermoplastic sheeting by locally preheating the edge areas of the sheet immediately prior to the knurling operation.

A further object is, in the case of polyethylene terephthalate sheeting which has been oriented and heat set, to locally preheat the area to be knurled within the range of 170° to 280° F. and then knurl the edges to a total thickness approximately 50% above the basic sheet thickness and thus produce a perfectly flat, undistorted knurled edge.

The novel features that I consider characteristic of my invention are set forth with particularity in the appended claims. The invention itself, however, both as to its organization and its methods of operation, together with additional objects and advantages thereof, will best be understood from the following description when read in connection with the accompanying drawings, in which:

FIG. 1 is a schematic diagram, in perspective, showing how the edge of a thermoplastic sheet is deformed by a conventional cold knurling operation, FIG. 2 is similar to FIG. 1 but showing how the edge of the sheet remains flat when knurled according to the present invention, FIG. 3 is a schematic showing, in perspective, of an apparatus by means of which the present invention can be carried out, FIG. 4 is a fragmentary sectional view, on an exaggerated scale, through several convolutions of coiled sheeting at the windup stage, and showing the spacing function of one type of thickened edges, and FIG. 5 is a similar sectional view illustrating the spacing function of still a different type of thickened edge.

At certain stages of their manufacture many kinds of sheet material have to be coiled up for transportation to the place where they are given further treatment. Sometimes they have to be stored for considerable periods before the subsequent treatment takes place. Very often the surfaces of these webs of material are in such a condition that defects can develop in them when they are brought into contact, especially prolonged contact or contact under great pressure. In the manufacture of solvent-type plastic film base, e.g. cellulose acetate, cellulose nitrate, etc., it has been common practice to cold knurl the edges of the sheet prior to winding it up, the raised projections caused by such knurling serving to maintain the convolutions of the web in sufficiently spaced relation, see U.S. Patent 1,651,744. In the manufacture of oriented polymeric thermoplastic sheeting, including polyamides, polycarbonates, and polyesters, and more particularly polyethylene terephthalates, it has been common practice to cold knurl the edges of the sheeting to improve the winding characteristics of the sheet and to improve the ability to manipulate the sheet during subsequent processing steps, e.g. application of coatings, finish cutting, etc. In the case of oriented polymeric thermoplastic sheeting the forces and plastic flow caused by the knurling operation has been found to result in locally deformed areas along the knurled edges of the sheet which diminish the capability of the knurled edges to improve the handling characteristics of the sheet.

The present invention concerns the discovery that these objectionable deformations in the edge of the sheet resulting from a cold knurling operation can be overcome if the portions of the oriented sheet to be knurled are locally preheated prior to knurling. This preheating step can be continuously carried out just ahead of the knurling device by any suitable means, e.g. infrared heaters, a blast of hot air, etc. A proper combination of preheat temperature of knurl force will produce the desired knurl thickness and the resulting sheet will have edges that are perfectly flat and free of fluting, cupping, dishing, etc.

According to the present invention, the shrinkage introduced in the edges of the oriented sheet by the preheating step is exactly counteracted by the physical distortion and plastic flow resulting from the knurling operation to prduce the desired result.

By way of illustration, I shall described the application of my process to the manufacture of sheets of oriented and heat set polyethylene terephthalate sheeting, although my invention is not limited thereto but is equally applicable to any oriented polymeric thermoplastic sheeting. My method may be carried out by many different types of apparatus or even by hand, but in commercial practice properly arranged mechanism is, of course, preferred.

Referring now to the drawing, FIG. 3 is a simplified representation of typical apparatus which might be employed to accomplish hot knurling according to the present invention. The sheet of thermoplastic material 10 moving from right to left, as indicated by the directional arrow, has previously passed through an orienting step where it has been stretched while heated, at least longitudinally, by any one of several well known techniques. The edges of the sheet are then knurled as shown at K by being passed between a pair of knurling wheels 12 and 12'. The shaft of one knurl wheel 12' is fixed against transverse movement, while the opposite knurl wheel 12 is pneumatically or otherwise loaded by a pneumatic cylinder 14 operating through a link 15 connected with the shaft 16 of the wheel. The pneumatic cylinder applies the pressure required to produce the desired knurl thickness. While the knurling may be done by thickening the edges of the sheet by projections rising above only one face of the sheet, see FIG. 4, in the preferred embodiment these projections extend beyond both faces of the sheet, as shown in FIG. 5, so that the total thickness of the knurl is equal to the sum of the two projections.

This knurling operation per se is not novel in the manufacture of polymeric thermoplastic sheeting but it has always been performed on the sheet after the sheet has cooled down below the softening point of the plastic or below the temperature where the previous orientation of the sheet is affected. As mentioned above, this "cold" knurling has caused a general deformation of the edge of the sheet which diminishes the capability of the knurled edge to improve the handling characteristics of the sheet. As shown in FIG. 1, this undesirable local deformation of the edge of the sheet may take the form of a lengthwise fluting of the sheet portion adjacent the edge. In other cases, the knurl area of the sheet is laterally dished or cupped, or at times both of these types of deformations may exist simultaneously.

According to the present invention the edge portions of the sheet immediately prior to passing between the knurling rolls are locally preheated. As shown in FIG. 3 this preheating operation can be performed with an infrared heater 20 placed below the edge of the sheet ahead of the knurling wheels. It is pointed out that this preheating operation can be performed by any other suitable means, e.g. hot air blasts, heated rollers, etc.

The local heating of the edge portions of the sheet causes a small amount of shrinkage due to relaxation of oriented molecule segments. Variations of the amount of heating will increase or decrease this localized shrinkage in a well controlled fashion. A sheet thus treated, but without subsequent knurling, would show a tightened, or shortened, edge portion. Additionally, the heating of the edge portion reduces the force required to produce the desired knurl thickness. Force reductions of 20 to 80% have been realized. Of course, the force required to obtain proper knurl thickness is also dependent upon the amount of heating.

It has been found that a proper combination of preheat temperature and knurl force will produce the desired knurl thickness and the resulting sheet will be perfectly flat at the edges and free of fluting. In general, the shrinkage induced in the edge by heat is exactly counteracted by the physical distortion and plastic flow of the sheet resulting from the knurling operation so as to produce the desired result. For example, I have found that if the edge portion of a 2½ mil thick sheet of polyethylene terephthalate oriented by longitudinal and lateral stretching and heat set is preheated to 200° F. just before being passed between ⅝″ wide 3″ diameter knurling wheels adjusted to apply 20 to 30 pounds knurling force to the edges of the sheet, a perfectly flat, undistorted knurled edge will be produced on the sheet as shown in FIG. 2. Under these conditions of operation the edges of the sheet will be knurled to a total thickness approximately 50% above the basic sheet thickness.

In general, the higher the preheat temperature the lower the knurling force must be to obtain the desired thickness of knurl. The heating range is limited between a lower limit which will be sufficiently great to produce the necessary relaxation of the oriented thermoplastic sheeting, and an upper limit beyond which the sheet is too soft to permit the application of knurls without gross edge collapse and/or distortion. While this range of temperatures will vary with different thermoplastic sheeting, as mentioned above, with polyethylene terephthalate the temperature range for this preheating step when used with oriented and heat set sheeting 1 to 10 mils thick is 170° to 280° F. It goes without saying that the invention is not limited to the physical reformation of the edges of the sheet being accomplished by a knurling operation of the type shown, but includes any kind of mechanical embossing operation.

In the specific case of "knurling" practices disclosed, the phenomenon of selective shrinkage permits an optimizing of heating and knurling forces to accomplish a desired result. In a different application, an oriented thermoplastic sheeting material which contains an undesired characteristic, for example, looseness (or extra length) in the center portion, can be corrected and made perfectly flat by the application of the local heating process. In some "hot knurling" applications, the lack of flatness in the pre-knurl film or sheeting requires the use of local heat (and resultant selective shrinkage) in areas other than the immediate knurl position to achieve the desired final sheet characteristic.

I claim:

1. In the process of physically re-forming the edges of a sheet of an oriented polymeric thermoplastic sheet material to improve the winding and guiding characteristics of the sheet comprising the step of mechanically embossing the edges of said sheet to increase the thickness thereof; the improvement comprising locally preheating the edge portions of the sheet immediately prior to the embossing operation to a temperature sufficient to cause a shrinkage of the edge portions to an extent sufficient to counteract the longitudinal and/or lateral deformation of said edge portions produced by such embossing.

2. In the process of physically re-forming the edges of a sheet of oriented polymeric thermoplastic sheet material to improve the winding and guiding characteristics of the same comprising the steps of thickening the edges of the sheet by subjecting them to an embossing force; the improvement comprising locally preheating the edge portions of the sheet immediately prior to the embossing operation to a temperature sufficient to cause shrinkage of the edge portions of the sheet, said heating coordinated with the embossing force to which the sheet is subjected so as to produce a desired embossing thickness while compensating for and counteracting the overall longitudinal and/or lateral deformation of said thickened edges produced by such embossing to leave the thickened edges of the sheet substantially free of such deformation.

3. The process according to claim 2, in which the sheet is polyethylene terephthalate 1 to 10 mils thick, the embossing force is 20 to 150 pounds, and the preheating temperature is 170° to 280° F.

(References on following page)

References Cited

UNITED STATES PATENTS

| | | | |
|---|---|---|---|
| 1,651,744 | 12/1927 | Van Derhoef | 264—146 |
| 2,849,752 | 9/1958 | Leary | 264—230 |
| 2,899,713 | 8/1959 | Lundsager | 264—284 |
| 2,976,567 | 3/1961 | Jones | 264—284 X |
| 3,308,215 | 3/1967 | Last | 264—230 X |
| 3,341,643 | 9/1967 | Barnhart | 264—230 X |
| 3,354,022 | 11/1967 | Dettre | 264—284 X |
| 3,355,531 | 11/1967 | Barnhart et al. | 264—230 X |

FOREIGN PATENTS 1,078,644  8/1967  Great Britain.

ROBERT F. WHITE, Primary Examiner

ALLEN M. SOKAL, Assistant Examiner

U.S. Cl. X.R.

264—284